3,471,803
**LASER HAVING A STABILIZED
OUTPUT SPECTRUM**
Donald C. Forster, Woodland Hills, Calif., assignor to
Hughes Aircraft Company, Culver City, Calif., a corporation of Delaware
Filed Apr. 28, 1967, Ser. No. 634,701
Int. Cl. H01s 3/10
U.S. Cl. 331—94.5                                    4 Claims

ABSTRACT OF THE DISCLOSURE

This is a laser having a stabilized output spectrum that produces an unmodulated output beam. The invention incorporates a tunable laser to be stabilized and a single mode dither-stabilized laser system that is used as a reference. Samples of the energy generated by both the tunable laser and the stabilized laser system are mixed to produce an output signal whenever the difference in frequency between these two energies is near zero. By utilizing a single generated by the stabilized laser system as a gate timing base, the output signal is also fed to a gating arrangement to provide an error signal that is coupled to the tunable laser of the correct polarity and magnitude to stabilize the output spectrum of the laser.

---

The need for and advantages of a stabilized source of oscillations are well known in the radio frequency (RF) electromagnetic energy art. The need for and advantages of such a source of oscillations also apply to the much higher near optical and optical frequency range generators such as lasers, for example, but is much more difficult to attain. A stabilized laser oscillator is extremely useful in a linear measurement system, for example, and also has many advantageous metrological applications. Furthermore, it can be used as a source to make accurate gain linewidth measurements and investigations of single atom coherence effects in lasers.

Ordinary electronic rf oscillators are usually stabilized by referencing to some stable controlling element such as a piezoelectric crystal. The crystal oscillator is intrinsically order of magnitude more stable than the frequency determining elements in the oscillator such as LC circuit parameters. The problem with optical oscillators is that there are no known frequency determining elements related to lasers as crystals are related to LC oscillators. One drawback of most laser oscillators to date is that the actual oscillation frequency is determined to the first order by the cavity spacing. This means that such a laser oscillator capable of extremely high purity frequency output over a long time period is limited by the mechanical stability of the cavity. The two principle causes of mechanical instability are microphonics, including acoustic effects, and thermal drift. A third possible source of drift is atmospheric pressure changes which can be neglected here since it can easily be eliminated by conventional means.

The ususal way to stabilize a laser oscillator has been to isolate it from thermal and mechanical shock. Usually this involves immersing the laser cavity in as nearly a constant temperature bath as possible, such as a controlled temperature and humidity room and mounting the laser cavity on a vibration-free and isolated platform, sometimes located underground. The cavity mirrors have also been mounted internally with respect to the laser in order to remove fluctuations due to perturbations in the cavity, such as scattering from dust particles, etc., that afflict Brewster angle lasers with externally mounted mirrors, for example. Generally, isolation methods have proved to be impractical for most applications.

Feedback systems have also been used in an effort to obtain satisfactory stabilization. In an early attempt to gain the desired goal, a servo system was devised to keep the total output intensity at a maximum. However, this techinique provide to be too insensitive to stabilize the oscillator to within better than some tens of megacycles. Later, what has become known as the dither-stabilizing system was developed where an error signal was produced by oscillating one of the reflectors comprising the resonant cavity of the laser at an audio rate and directing a portion of the laser output beam at a photodetector, the output of which was the phase detected to provide a DC voltage proportional to the derivative of the curve of output power plotted against frequency. The laser output was then locked to one of three zero slope points resulting from a center tuning dip by properly applying this feedback energy to the oscillating reflector. The drawback here was that the laser beam was frequency modulated. A more detailed description of this technique may be reviewed by referring to an article by W. R. C. Rowley and D. C. Wilson, in Nature, London, vol. 200, pp. 745–747, November 23, 1963.

In contrast to the prior laser stabilization art as described above, the invention has the advantage of providing a laser having a stabilized output spectrum that is free of modulation.

It is therefore an object of the present invention to provide an improved stabilized laser oscillator.

It is another object of the invention to provide a stabilized laser oscillator that produces an output signal free of modulation.

These and other objects of the invention are obtained according to one embodiment of the invention, in a laser having a stabilized output spectrum including a laser to be stabilized producing an output beam at a predetermined frequency and also including a frequency stabilized laser system having a single mode laser producing a frequency stabilized beam of energy, the frequency of which is periodically swept across the frequency of the first-mentioned output beam. The stabilized laser system also produces a synchronizing signal related to the sweep rate of the frequency stabilized system beam. A mixing arrangement is optically coupled to the output beam and to the stabilized beam from the stabilized laser system and produces an output signal whenever the frequency difference between the beams passes through zero. The output signal from the mixing arrangement and the synchronizing signal from the stabilized laser system are coupled to a gating arrangement that produces an error signal, the polarity and magnitude of which are related to the direction and extent of difference between the frequency of the output beam and the center frequency of the stabilized beam. This error signal is fed back to the laser to be stabilized and causes the laser oscillator frequency to be referenced to that of the stabilized laser system.

The invention and specific embodiments thereof will be described hereinafter by way of example and with reference to the accompanying drawings wherein like reference numerals refer to like elements or parts and in which.

Figure 1:
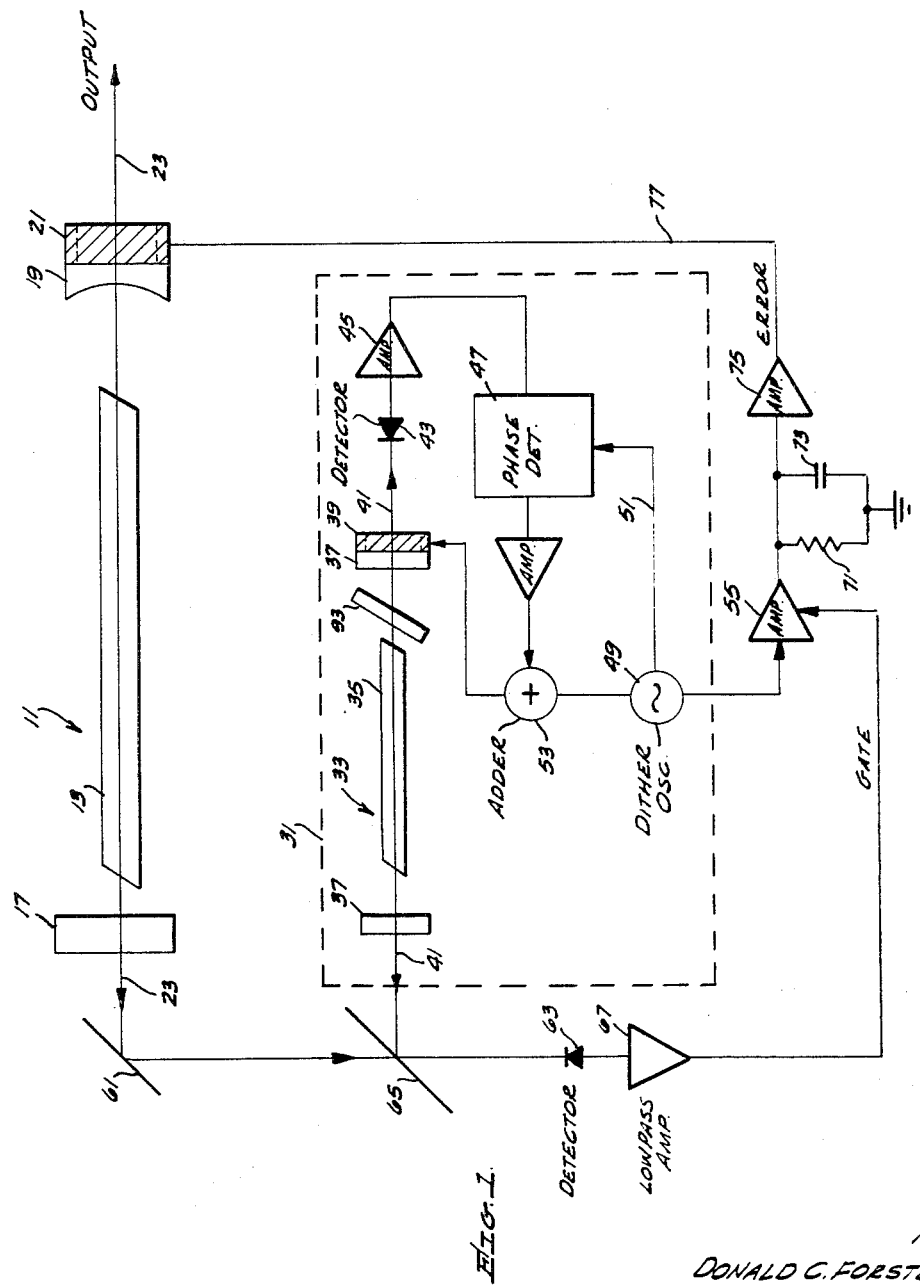
FIG. 1 is a schematic diagram of a preferred embodiment of the invention in which a dither-stabilized laser system is used as a reference.

With reference now to the drawings and more particularly to FIG. 1, there is shown a laser having a stabilized output spectrum comprising a laser oscillator 11 including an active laser element 13 which, for example, may be a container filled with argon and further including a first partially transmissive mirror 17 and a second partially transmissive mirror or reflector 19 that is mechanically coupled to an electromechanical transducer element 21. When properly energized by pumping means not shown for clarity, the laser 11 produces an output beam designated here as line 23, which beam projects through both mirrors 17 and 19 and also through the transducer 21 which may be comprised of a piezoelectric ceramic material such as quartz with an aperture therethrough to accommodate the passage of the output beam 23. Since only a small amount of energy is needed for sampling purposes in the stabilization of the oscillator 11, the partially transmissive mirror 17 may be made much more reflective than the partially transmissive mirror 19 through which the main output of the laser will be taken.

Also shown in FIG. 1 is a frequency stabilized laser system generally inscribed by the dashed line 31 and including a single mode laser comprising an active laser element 35 and two partially transmissive reflectors 37, one of which is mechanically coupled in a conventional manner to an electromechanical transducer 39 that is similar to the transducer 21 of the laser oscillator 11. The laser 33 produces an output beam 41 which is detected by a photodetector 43, the output of which is amplified by an amplifier 45 before being coupled to a conventional phase detector 47. The stabilized laser system also includes an audio frequency oscillator 49 generally known as a dither oscillator which provides a reference signal along line 51 to the phase detector 47 and also provides such a signal to an adder 53 and to a gating amplifier 55 for synchronizing purposes. The output of the phase detector 47 is coupled through and amplified by an amplifier 57 before being summed with the signal from the dither oscillator 49 at the adder 53. The output of the adder is the sum of a stabilized laser system error signal and the dither drive signal and is coupled to the transducer 39 in order to control this laser's output frequency.

As can be seen from the drawing, the sampled portion of the output beam generated by the laser 11 is reflected by a first mirror 61 and is detected by a detector 63 after passing through a partially transmissive mirror 65. Also, a sampled portion of the output beam 41 from the stabilized laser oscillator 33 is reflected by the partially transmissive mirror 65 and is simultaneously detected also by the detector 63. The output of the detector 63 may be amplified by a low pass amplifier such as amplifier 67, the output of which is used as a gating signal that is coupled to and gates the amplifier 55. The output of the amplifier 55 is an error signal in pulse form which may be smoothed to a DC signal by filtering as provided by an RC combination comprising a resistor 71 and a capacitor 73 shunted together to a common return. The DC error signal may then be amplified further by an amplifier 75 which provides an amplified error signal along a line 77 to the transducer 21 of the laser 11.

Figure 2:
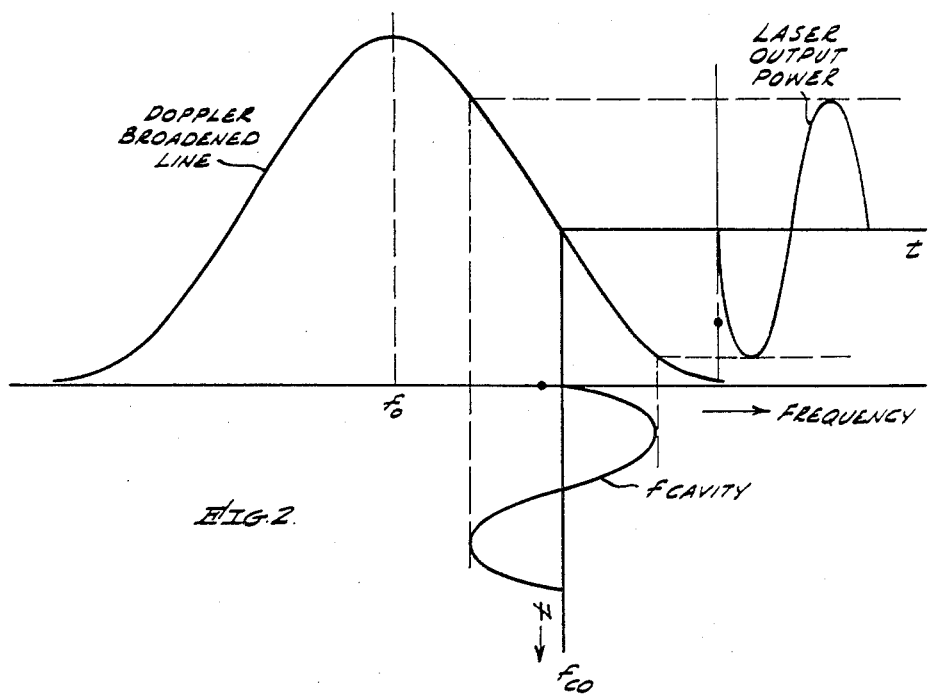
FIG. 2 is a sketch of the transfer characteristic between cavity modulation and output power as used in the dither-stabilized laser system of FIG. 1.

In describing the operation of the invention, it will be helpful first to describe the frequency stabilized laser system 31 before describing the inter-relationship between this laser oscillator system and the laser to be stabilized. In the "dither" method of stabilization, an error signal is produced by oscillating one of the reflectors comprising the resonant cavity of the laser 33, such as the mirror 37, at an audio rate, for example 350 c.p.s., and directing a portion of the laser output beam 41 at a photodetector 43. The resulting modulation of the photodetector output is homodyne or phase-sensitive detected by the phase detector 47 to provide a DC voltage proportional to the derivative of the curve of the output power plotted against frequency. The laser output is then locked to one of three zero slope points resulting from a center tuning dip by properly applying this feedback energy by way of the adder 53 to the transducer 39 and the reflector 37. The transducer 39 may be comprised of a piezoelectric material or it may be a magnetostrictive element caused to move in a sinusoidal fashion at a low frequency by being coupled to the dither oscillator 49 as shown. This, in effect, moves the cavity resonance frequency within the Doppler broadband line as illustrated in FIG. 2. As a consequence, the output power of the laser 33 is modulated; the phase of the modulation on the output depends upon whether the center cavity frequency $f_{co}$ is above or below the line center frequency $f_o$. Error signals can be produced using either amplitude and/or phase comparison techniques that are well known in the art. When superposed on the dither signal to the electromechanical motion generators, i.e. the transducer 39, the error signals drive $f_{co}$ toward $f_o$. Gas lasers such as helium-neon can be stabilized to a few megacycles using this technique where single mode operation is assured using very short resonators to make cavity mode separation comparable to linewidth. Therefore, the output beam 41 of the frequency stabilized laser system 31 is a stabilized reference signal having a modulation component superposed thereon. Also provided by the stabilized laser system 31 is a synchronizing signal related to the sweep rate of the frequency stabilized beam 41, which signal is coupled to the gating amplifier 55.

Figure 3:
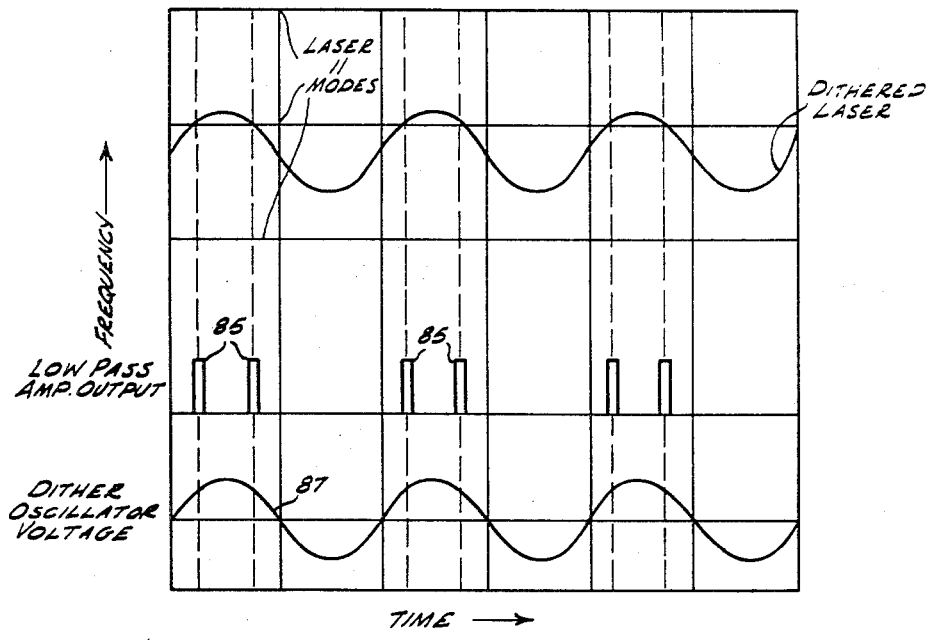
FIG. 3 is a graphic representation of frequency and voltage characteristics of various elements in the laser configuration of FIG. 1.

In order to stabilize the output spectrum of the laser 11, the stabilized beam 41 must sweep through the frequency of the output beam 23 and the laser output beam 23 that is sampled should preferably have a clean comb spectrum characteristic. As described previously, samples of the two output beams of the two lasers are superposed on the photodetector 63 and may be represented by the graph shown in FIG. 3. Since the frequency of oscillation of the dithered laser 33 sweeps through the laser oscillator frequency of the laser 11, low frequency beats will occur each time the frequency of the dithered laser crosses that of one of the modes of the laser 11. When these beats occur, pulses 85 will be generated and then amplified by the low pass amplifier 67. If the frequency of the laser 11 mode is higher than the center frequency of the dithered laser 33, as shown for example in FIG. 3, the pulses 85 both occur during the positive half cycle of the dithered excursion 87 and vice versa. By feeding the dither oscillator reference signal as drive to the amplifier 55 and by using the pulses as a gating signal, an error signal is generated whose polarity is related to the direction in which the laser 11 mode frequency differs from line center of the stabilized laser 33. This error signal is applied to the transducer 21 comprising a piezoelectric ceramic, for example, supporting the mirror 19 of the laser 11 and serves to lock its mode to the center of the stabilized laser mode of the stabilized system 31. With this method, stabilization is effective over long terms because the spectrum is locked with respect to the atomic line center, an absolute reference.

As an example of its usefulness, the output of a high power single transverse mode (TEM$_{oo}$) laser may be stabilized to a few megacycles by locking one of its longitudinal modes near spectrum center to the single frequency line generated by the stabilized single mode laser system producing of the order of only $100\mu$ watts of output power.

The type of gating arrangement used to provide the error signal fed to the laser to be stabilized is not critical. For example, the output from the photodetector 67 may be fed to a pair of gates along with the synchronizing signal from the dither oscillator 49 to control the gates and then to a bistable circuit so that one of the gates is opened if the frequency of oscillation of the laser 11 is increasing and the other gate is opened if the frequency is decreasing. A square wave output from the bistable circuit is thus obtained which may be then averaged and smoothed by conventional circuitry and fed to the transducer 21 of the laser 11 as an error signal.

From the foregoing, it should be seen that the invention provides an improved laser having a stabilized output spectrum wherein the frequency determining factor is atomic rather than mechanical and that has an unmodulated output where desired. It should also be noted that the invention allows the stabilization of a high power laser by the use of a very low power single mode dither-stabilized laser.

In practicing the invention, any active laser material may be used as long as the frequency of oscillation of the dithered laser may be swept across the frequency of oscillation of the laser to be stabilized, where the stabilized laser can be operated as a single mode laser. In a gas system for example, helium-neon and xenon lasers have proved to be satisfactory.

It is intended that the foregoing disclosure and drawings shall be considered only as illustrations of the principles of this invention and are not to be construed in a limiting sense.

What is claimed is:

1. A laser have a stabilized output spectrum comprising:
   a laser to be stabilized, which laser produces an output beam at a predetermined frequency and which laser includes tuning means for adjusting the frequency of oscillation thereof;
   a frequency stabilized laser system including a single mode laser producing a frequency stabilized beam of energy the frequency of which is periodically swept across the frequency of said output beam, said system also producing a synchronizing signal related to the sweep rate of said frequency stabilized beam;
   mixing means optically coupled to said output beam and to said stabilized beam for producing an output signal whenever the frequency difference between beams become zero; and
   gating means having one input coupled to said mixing means an another input coupled to said stabilized laser system and an output coupled to said tuning means, said gating means being responsive to said output signal and to said synchronizing signal for producing an error signal having a polarity and magnitude related to the direction and extent of difference between the frequency of said output beam and the center frequency of said stabilized beam.

2. A laser having a stabilized output spectrum comprising:
   a laser to be stabilized, which laser produces an output beam at a predetermined frequency and which laser includes tuning means for adjusting the frequency of oscillation thereof;
   a frequency stabilized laser system including a single mode laser producing a frequency stabilized beam of energy the frequency of which is periodically swept across the frequency of said output beam, said system also producing a synchronizing signal related to the sweep rate of said frequency stabilized beam;
   mixing means including a photodetector optically coupled simultaneously to said output beam and to said stabilized beam for producing an output gating signal whenever the frequency difference between said beams becomes zero; and
   gating means having one input coupled to said mixing means and another input coupled to said stabilized laser system and an output coupled to said tuning means, said gating means being responsive to said gating output signal and to said synchronizing signal for producing an error signal having a polarity and magnitude related to the direction and extent of difference between the frequency of said output beam and the center frequency of said stabilized beam.

3. A laser having a stabilized output spectrum comprising:
   a laser to be stabilized, which laser produces an output beam at a predetermined frequency and which laser includes tuning means for adjusting the frequency of oscillation thereof;
   a frequency stabilized laser system including a single mode laser producing a frequency stabilized beam of energy the frequency of which is periodically swept across the frequency of said output beam, said system also producing a synchronizing signal related to the sweep rate of said frequency stabilized beam;
   reflecting means disposed in the path of said output beam and said stabilized beam for directing a portion of the energies of said beams along the same optical path to form a combined beam;
   mixing means including a photodetector optically coupled to said combined beam for producing an output gating signal whenever the frequency difference between said beams becomes zero; and
   gating means having one input coupled to said mixing means and another input coupled to said stabilized laser system and an output coupled to said tuning means, said gating means being responsive to said output signal and to said synchronizing signal for producing an error signal having a polarity and magnitude related to the direction and extent of difference between the frequency of said output beam and the center frequency of said stabilized beam.

4. A laser having a stabilized output spectrum comprising:
   a laser to be stabilized, which laser produces and output beam at a predetermined frequency and which laser includes tuning means for adjusting the frequency of oscillation thereof;
   a frequency stabilized laser system including a single mode laser producing a frequency stabilized beam of energy the frequency of which is periodically swept across the frequency of said output beam, said system also producing a synchronizing signal related to the sweep rate of said frequency stabilized beam;
   reflecting means disposed in the path of said output beam and said stabilized beam for directing a portion of the energies of said beams along the same optical path to form a combined beam;
   mixing means including a photodetector optically coupled to said combined beam for producing an output signal having beat frequency components whenever the frequency difference between said beams beams becomes zero;
   a low pass amplifier coupled to said photodetector for amplifying said beat frequency components; and
   gating means having one input coupled to said low pass amplifier and another input coupled to said stabilized laser system and an output coupled to said tuning means, said gating means being responsive to said beat frequency components and to said synchronizing signal for producing an error signal having a polarity and magnitude related to the direction and extent of difference between the frequency of said output beam and the center frequency of said stabilized beam so as to cancel said error signal.

References Cited

UNITED STATES PATENTS 3,395,367   7/1968   Bell et al.

JEWELL H. PEDERSEN, Primary Examiner

WILLIAM L. SIKES, Assistant Examiner

U.S. Cl. X.R.

250—199; 350—160